United States Patent [19]

Farcy

[11] 4,343,994

[45] Aug. 10, 1982

[54] PARTICLE DETECTOR AND ITS PRODUCTION PROCESS

[75] Inventor: Paul Farcy, Clamart, France

[73] Assignee: Commissariat a l'Energie Atomique, Paris, France

[21] Appl. No.: 132,403

[22] Filed: Mar. 21, 1980

[30] Foreign Application Priority Data

Mar. 29, 1979 [FR] France ................................ 79 07924

[51] Int. Cl.$^{3}$ ........................ G01T 3/00; H01J 47/12

[52] U.S. Cl. .................................... 250/390; 376/255

[58] Field of Search .......................... 176/19 R, 19 E; 250/390–392, 370, 388; 376/255

[56] References Cited

U.S. PATENT DOCUMENTS

| | | | |
|---|---|---|---|
| 2,491,220 | 12/1949 | Segre et al. | 250/390 |
| 3,259,745 | 7/1966 | Garlick et al. | 250/392 |
| 3,649,473 | 3/1972 | Holden et al. | 176/19 R |
| 3,742,274 | 6/1973 | O'Boyle et al. | 250/390 |
| 3,751,333 | 8/1973 | Drummond et al. | 176/19 R |
| 4,044,301 | 8/1977 | Allain et al. | 250/390 |
| 4,071,764 | 1/1978 | Thurlow | 250/390 |

*Primary Examiner*—Sal Cangialosi

*Attorney, Agent, or Firm*—Pearne, Gordon, Sessions, McCoy & Granger

[57] ABSTRACT

Particle detector, wherein it comprises a ceramic body in one piece in which are sealingly embedded two concentric tubular electrodes which define between them an annular chamber filled with pressurized gas, and the electrical wires connecting the electrodes to the outside of the body.

The invention also relates to a process for producing a particle detector by the wet or dry route.

The particle detector, which is more particularly a neutron detector can be used with particular advantage in the core of a nuclear reactor.

18 Claims, 7 Drawing Figures

PARTICLE DETECTOR AND ITS PRODUCTION PROCESS

BACKGROUND OF THE INVENTION

The invention relates to a particle detector for positioning in the trajectory or path of the particles in such a way as to ionize the molecules of a gas in the such case of random nuclear particles or to bring about the fission of fissile materials in the case of neutral particles such as neutrons, the ionization or fission being detected by means of two electrodes between which is established a constant electrical field. The invention also relates to a process for the production of such a detector.

In most conventional applications, the ionization chamber defined between the electrodes in a detector of random particles or the fission chamber in a neutron detector are made by simply assembling the electrodes within a body made in several parts so as to permit the installation of the electrodes.

The construction of the particle detector body in a plurality of parts is, however, prejudicial to the satisfactory operation of the detector in certain special applications and particularly when the detector has to be used at high temperatures, for example above 600° C. and when it is arranged in a particularly intense flow of particles. Such a situation more particularly occurs when these detectors are used for measuring the neutron flux in the core of a nuclear reactor. Moreover, in this special case, it is necessary to be able to provide an elongated detector, whose overall dimensions level with its cross-section are as small as possible.

When the particle detector body is made in several parts, it comprises both assembly members and sealing members. Generally, a certain number of these members are made from metal and contain traces of cobalt, tungsten or other metals, whose high temperature activation leads to the complete falsification of the measurements performed by the detector.

BRIEF SUMMARY OF THE INVENTION

The invention therefore relates to a particle detector making it possible to perform precise measurements at high temperatures, no matter what the particle flow to which it is exposed and having preferably an elongated shape and a very small radial cross-section.

The present invention therefore relates to a particle detector, wherein it comprises a ceramic body in one piece in which are sealingly embedded two concentric tubular electrodes which define between them an annular chamber filled with pressurized gas, and electrical wires connecting the electrodes to the outside of the body.

As a result of the construction of the detector body in one piece, the sealing members generally used in the known detectors are completely eliminated and the only metal elements which are left are the electrodes and the electrical connecting wires.

According to a preferred embodiment of the invention, said detectors serve to detect electrically neutral particles and in particular neutrons, in such a way that at least one of the facings surfaces of the electrodes is covered by a layer of fissile material, the annular chamber then being a fission chamber. Preferably, the layer of fissile material is regular and uniform.

According to a secondary feature of the invention, the detector body is made from fritted alumina. According to another secondary feature of the invention, the outer surface of the detector body can be metallized in order to form a shield.

According to yet another secondary feature of the invention, the electrical connecting wires are constituted by a coaxial cable defining an armature on which are mounted the electrodes. The coaxial cable is then preferably made from platinum.

The different materials referred to hereinbefore for forming the body, electrodes and electrical connecting wires of the detector, are not essential for the realisation of the invention. However, they contribute to the obtaining of the desired result, i.e. in particular the good high temperature behaviour of the detector. Thus, they make it possible to eliminate virtually all traces of metals such as cobalt or tungsten.

The invention also relates to a process for the production of the particle detector defined hereinbefore using the wet route, wherein it comprises the successive stages of constructing a subassembly incorporating two concentric tubular electrodes, a filling material which is rigid at ambient temperature and is at least partly positioned between the electrodes in order to ensure the centering thereof and electrical connecting wires connected to the electrode; moulding a ceramic material body on said subassembly in such a way that the latter is embedded in the body with the exception of one free end of the connecting wires, at least one free end of one vent traversing the body between the filling material and the exterior; fluidization by heating the filling material and discharging the latter through the vent so as to define an annular chamber between the electrodes; the introduction of a pressurized gas into the annular chamber through the vent; and closing the vent by the melting of a plug of ceramic material of the same type as that constituting the body.

According to a secondary feature of this production process, the ceramic body is moulded in vacuo and the said ceramic material is preferably dried before the fluidization of the filling material. Fluidization can be carried out, for example, during the first phase of a baking stage of the ceramic body. Preferably, baking is then performed under a reducing atmosphere and the detector is positioned vertically in such a way as to prevent flaming thereof during baking.

However, according to the invention, the detector can also be manufactured by the wet route and its production process then comprises the successive stages of constructing a subassembly incorporating two concentric tubular electrodes, a filling material which is rigid at ambient temperature and at least partly disposed between the electrodes in order to ensure their centering, electrical connecting wires connected to the electrodes and a ceramic rod positioned within the inner electrodes; constructing a body of a ceramic material of the same composition as that of the rod about the subassembly by treating with a torch, in such a way as to embed the subassembly, with the exception of one free end of the connecting wires and provide at least one vent between the filling material and the outside; fluidization by heating the fluid materials and discharging the latter through the vent in such a way as to define an annular chamber between the electrodes; introduction of a pressurized gas into the annular chamber through the vent; and closing the vent by melting a plug of a ceramic material of the same type as that constituting the body.

When the detector is used for the detection of neutral particles such as neutrons, a layer of fissile material is deposited on at least one of the facing faces of the electrodes before the latter are incorporated into the subassembly.

According to another secondary feature of the invention, the stages of introducing the pressurized gas into the annular chamber and closing the vent are performed within a tightly sealed enclosure provided with a pressurized gas intake and a window, the melting of the plug of ceramic material being performed by means of a laser through the said window.

BRIEF DESCRIPTION OF THE DRAWINGS

The invention is described in greater detail hereinafter relative to non-limitative embodiments and the attached drawings, wherein show.

Figure 1:
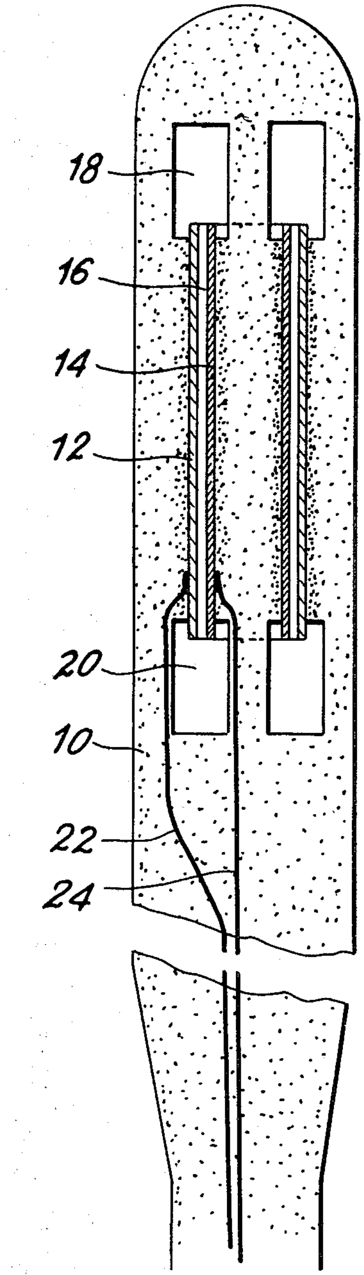
FIG. 1 a detector for particles, particularly neutrons, constructed according to the invention.

FIGS. *2a, 2b, 2c, 2d, 2e* and *2f* different stage of the production of the particle detector of FIG. 1.

DETAILED DESCRIPTION OF THE PREFERRED EMBODIMENTS

The particle detector of FIG. 1 is a neutron detector particularly suitable for use in the core of a nuclear reactor. It comprises an elongated body 10 having a relatively small cylindrical cross-section made in one piece from a ceramic material and preferably fritted and moulded alumina, according to a process which will be described hereinafter. Body 10 is moulded on two concentric tubular electrodes 12 and 14, preferably made from platinum, defining between them a fission chamber 16 issuing at each of the ends of electrodes 12 and 14 into annular chambers 18 and 20. The concentric electrodes 12 and 14, as well as the annular chambers 18 and 20 are themselves arranged coaxially with respect to the detector body 10. In per se known manner, the fission chamber 16 and the annular chambers 18 and 20 are filled with a pressurized gas such as argon, krypton, nitrogen, methane, etc ensuring an amplification of the fissions produced by the neutron flux, due to collisions between the fission products and the molecules of the gas. The nature of the filling gas is dependent on the temperature, pressure, distance between the electrodes and the sought speed. Although not shown in FIG. 1, at least one of the facing surfaces of electrodes 12 and 14 is covered with a regular and uniform fissile material. Among the various radioactive sources which can be used, reference is made in a non-limitative manner to $_{235}$U, $_{238}$Pu, Np, etc. Finally, the electrical connecting wires 22 and 24 are respectively connected to the outer electrode 12 (cathode) and inner electrode 14 (anode) and are embedded in the alumina body 10 and emerge at one reduced cross-sectional end of the latter so as to permit the electrical connection of the detector to a direct current source, as well as to a measuring and/or recording system of a per se known and not shown type. The wires 22 and 24 are preferably made from platinum. In addition, the outer surface of the alumina body 10 being metallized so as to form a shield.

When it is placed in a neutron flux and when a direct current is applied to the electrical connecting wires 22 and 24 to create a constant electrical field between electrodes 12 and 14, a certain number of neutrons, whose trajectory traverses the detector in such a way as to strike the layer of fissile material placed on the electrodes brings about the fission of the nuclei of certain atoms of said material, producing a chain reaction as a result of the fission products striking the molecules of the gas. As a result, a measurable electrical pulse is added to the constant potential difference applied between the electrodes. This pulse is easily detected by an electronic measuring and recording circuit which generally contains an amplifier.

As a result of the monolithic structure of the neutron detector body 10 making it possible to eliminate all sealing or assembly members, together with the choice of materials such as alumina for making the core 10 and platinum for making the electrodes 12 and 14 and electrical connecting wires 22 and 24, impure metals containing more particularly traces of cobalt or tungsten are completely eliminated so that the detector can be used without disadvantage at temperatures of approximately 800° C. and can be exposed to relatively intense neutron fluxes without falsification of the measurements.

A process for the production of the neutron detector according to claim 1 will now be described in an exemplified manner with reference to FIG. 2.

FIGS. *2a* and *2b* show two successive phases of a stage making it possible to construct a subassembly incorporating two concentric tubular electrodes 12 and 14, a filling material which is rigid at ambient temperature 26 occupying the fission chamber 16 and the two annular chambers 18 and 20 and the two electrical connecting wires 22 and 24.

The filling material used is chosen from among the materials having a structure not likely to deform during the following stage of moulding the alumina on said subassembly and shown in FIGS. *2c* and *2d*. However, this filling material 26 must be able to melt or evaporate without damaging the moulded and dried alumina body in such a way as to permit its elimination and this will be described hereinafter with reference to FIG. *2e*. In practice, it is possible to use camphor, resin, wax, etc.

The tubular electrodes 12 and 14 are preferably made by extrusion or shaping and then annealing. A layer of fissile material is then deposited on at least one of the facing surfaces of the electrodes. The electrical connecting wires 22 and 24, which are preferably of platinum like the electrodes 12 and 14 are then connected to the latter in the vicinity of one of their ends, e.g. by welding, as is shown in FIG. *2a*.

During a first assembly phase illustrated in FIG. *2a*, the filling material sintering blocks 26, whose external shapes correspond to those of the annular chambers 18 and 20 which it is desired to make are mounted on two ends of electrodes 12 and 14 in such a way as to centre the latter with respect to one another. The thus formed assembly is mounted on a shaping and centering tube 28, preferably arranged vertically to prevent flaming and made from stainless steel. Tube 28 has a groove 30 permitting the passage of wire 24. Moreover, at least one of the filling material blocks 26 has vents 32 which, during the second assembly phase of the subassembly illustrated in FIG. 2, permits the injection of the filling material 26 into the fission chamber 16 defined between electrodes 12 and 14.

The filling material 26, which is for example sublimable and which is injected between the electrodes make it possible to maintain intact the fissile material layer desposited on the electrodes, together with the distance between the electrodes.

The shape of the electrodes and the nature of the materials forming them make it possible to assist the ceramic-metal bond made during the following stages. Thus, the faces of the electrodes in contact with the alumina undergo sand blasting which creates roughnesses aiding the attachment and the metal used is platinum.

Due to the limited thickness of the electrode (between 3 and 40 hundreds of a millimeter, depending on the detector dimensions), it is useful to reinforce them by giving them a star-shaped cross-section which leads to a longitudinal direction stiffening.

Figures 2A, 2B, 2C, 2D:
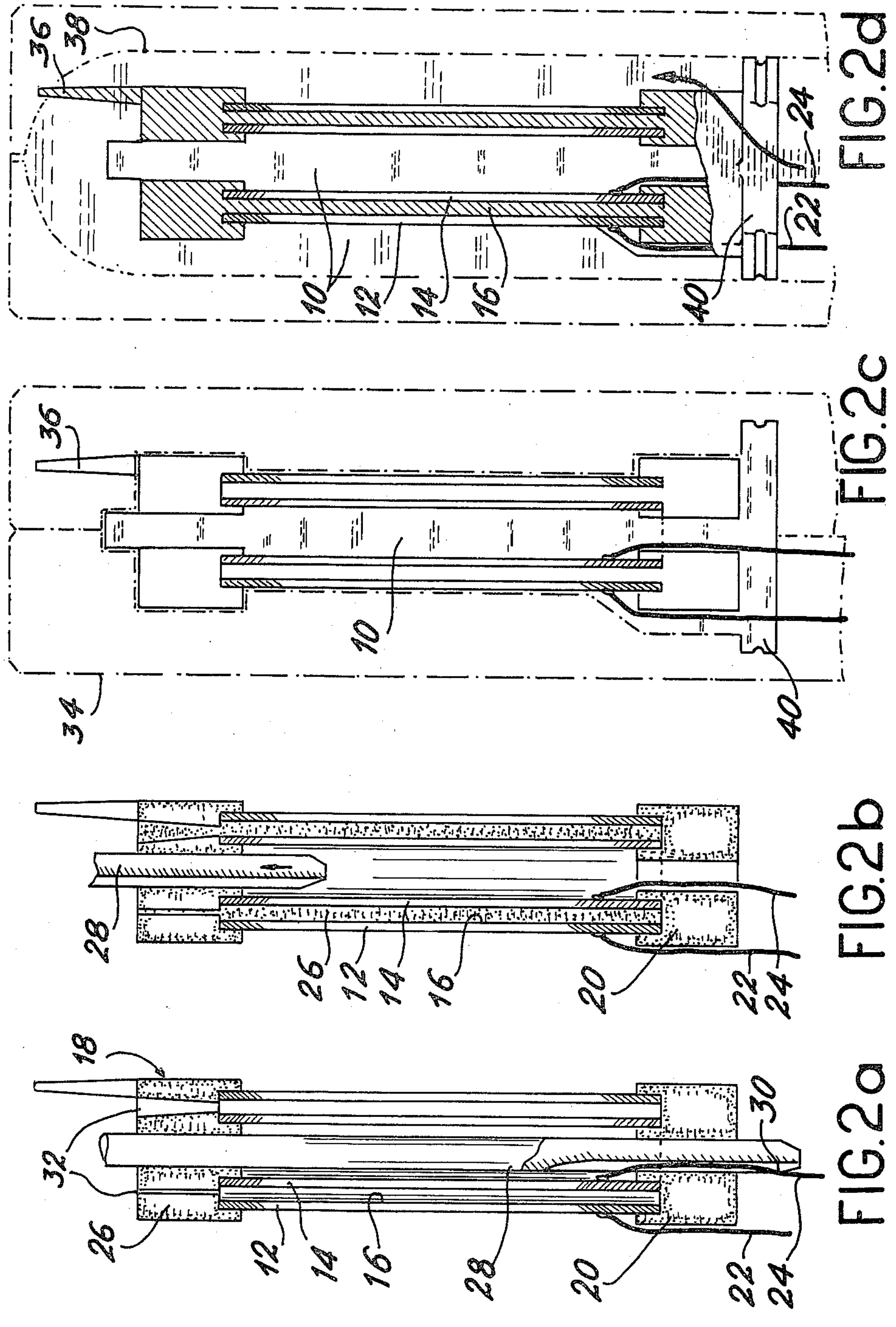

As shown in FIG. 2*b*, when the filling material is dry and sufficiently rigid, the shaping and centering tube 28 is removed, thus providing the aforementioned subassembly constituted by electrodes 12 and 14, filling materials 26 and the electrical connecting wires 22 and 24.

According to a not shown embodiment of the invention, the necessity of using a shaping and centering tube 28 is obviated by using as the electrical connecting wires a coaxial cable which defines an armature permitting the centering of the electrodes.

During a second stage of the production process of the particle detector according to the invention, illustrated in FIGS. 2*c* and 2*d*, the ceramic body 10 is moulded onto the subassembly either by the wet route or by the dry route.

The moulding by the wet route can be carried out either by gravity or in vacuo with the aid of thixotropy. Initially, the subassembly constituted by the two electrodes, the filling material and the electrical connecting wires is placed in a first mould 34, shown by mixed lines in FIG. 2*c* making it possible to produce the central core of the body 10 which is mainly positioned within the inner electrode 14. The position and centering of the subassembly within the mould can be realised, for example, by means of a pin 36 obtained by moulding during the manufacture of one of the centering blocks of filling material 26 defining the annular chambers 18 and 20.

After producing the central core of body 10, the subassembly is removed from mould 34 and placed in a second mould 38, shown by mixed lines in FIG. 2*d* and defining the external shape of body 10. The positioning and centering of the subassembly within mould 38 can be brought about both by means of pin 36 and by means of a circular alumina base 40 obtained during the previous moulding process.

The material constituting body 10 is formed from alumina granules of predetermined particle size and of which a given percentage is incorporated into a paste serving as a binder. These features make it possible to considerably reduce shrinkage which is vital here to maintain the electrode spacing and at a desired value.

Figure 2F:
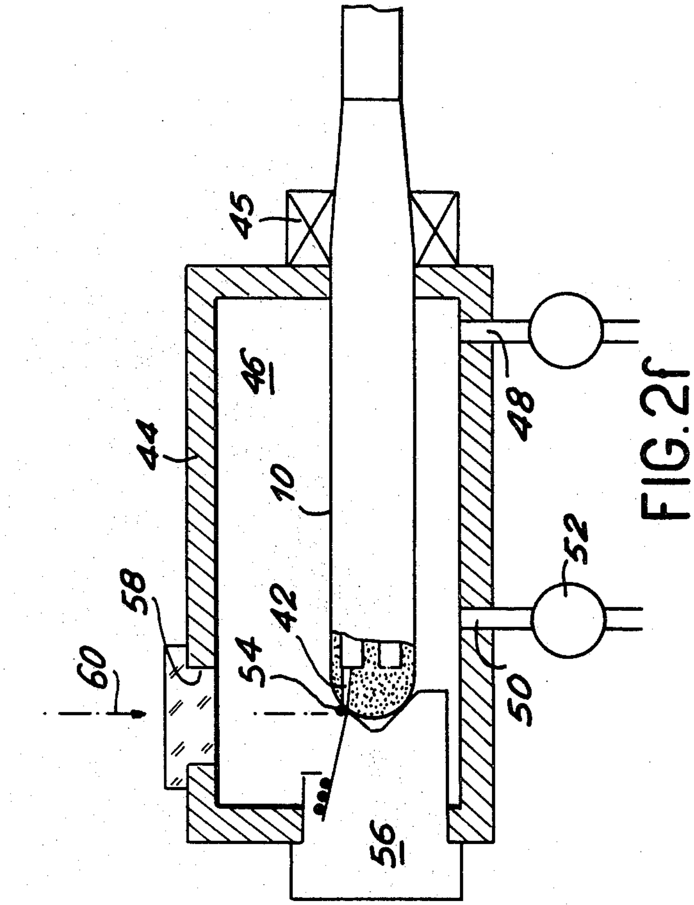
Figure 2E:
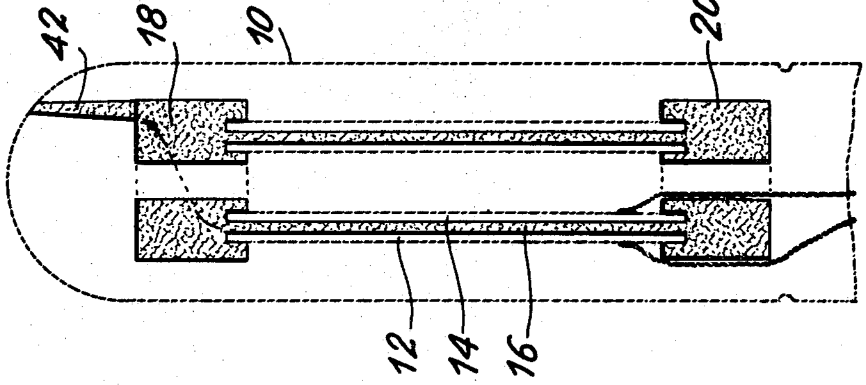

During a third stage of the production process, the thus obtained detector is placed vertically in a not shown oven, as illustrated in FIG. 2*e*, in order to prevent flaming thereof. Heating of the detector fluidizes the filling material, i.e. makes it liquid or gaseous, depending on the nature of the initially chosen material. It can also be eliminated through a vent 42 made in body 10 during moulding, for example by means of pin 36. This fluidization stage of the filling material 26 takes place after drying the body 10 and during the baking of the latter under a reducing atmosphere.

At the end of the stage described hereinbefore, the baking of the alumina body 10 is terminated and the fission chamber 16 defined between electrode 12 and 14, as well as annular chambers 18 and 20 defined at the ends of the latter are completed. The end of the detector in which the vent 42 is formed is generally placed in a tightly sealed enclosure 44, the detector traversing the enclosure wall via a sealing device 45, as illustrated in FIG. 2*f*. The gas which it is desired to inject into the fission chamber 16 and into the annular chambers 18 and 20 is introduced into chamber 46, defined within the tightly sealed enclosure 44, by an intake 48, whilst the gas enters the interior of the detector via vent 42. In order to permit the evacuation of the air within chamber 46 prior to introducing the gas through intake 48, chamber 46 is connected by an outlet 50 with a vacuum pump 52.

During the final stage of the production of the neutron detector according to the invention vent 42 is sealed by means of an alumina plug 54 in the form of a ball introduced into enclosure 44 and at the level of vent 42 by means of a feed mechanism, diagrammatically shown at 56 and which can also advantageously ensure the positioning of the particle detector within enclosure 44. The alumina ball 54 is brought level with vent 42 facing a window 58 made in the tightly sealed enclosure 34 and behind which is arranged a laser, diagrammatically shown at 60. Under the action of laser 60 ball 54 melts and seals the vent 52 in order to sealingly insulate the fission chamber 16, which has previously been filled with gas from the outside of the particle detector.

The process described hereinbefore with reference to non-limitative embodiments makes it possible to produce a particle detector whose body, made from a ceramic material and preferably alumina is made in one piece by moulding. The thus obtained detector can be used at a high temperature and in a relatively intense flow of particles, particularly neutrons, more specifically in the core of a nuclear reactor.

As stated hereinbefore, the detector according to the invention can also be produced by the dry route.

In this production process, the inner electrode 14, provided with its fissile deposit, is firstly positioned on an alumina rod and is then immobilised by crimping its ends onto the rod.

During a second stage, the outer electrode 12, whose ends have enlargements, is centered on electrode 14 by means of two end fittings 18 and 20, which are made from a sublimable material. Sublimable material can then be injected into the space between the electrodes, as shown in FIG. 2*b*.

A torch treatment process using an alumina rod, whose composition is substantially the same as that of the alumina rod within the electrode 4 (the latter containing approximately 95% by weight of alumina rods to which is added an aluminium wire) makes it possible to produce the outer part of body 10.

The sublimation of the filling material by the vent is then carried out by stoving.

Fritting for about 1 hour under an oxidizing atmosphere and at a temperature between 1400° and 1500° C. makes it possible to convert the aluminium into alumina and to make the detector tight.

The chamber 16 between the electrodes is filled and the vent 42 is closed in the same way as described in connection with the production process by the wet route.

This production process by the dry route is preferably used in the case of protectors having a small diameter and particularly in the case of microdetectors.

I claim:

1. A detector, for neutrons and the like, comprising a closed ceramic body in a single part within which are sealingly embedded two concentric tubular electrodes which define between them an annular chamber filled with pressurized gas, and electrical wires connecting the electrodes to the outside of the body.

2. A detector according to claim 1, for detecting electrically neutral particles and in particular neutrons, wherein at least one of the facing surfaces of the electrodes is covered by a layer of fissile material, the annular chamber then being a fission chamber.

3. A detector according to claim 2, wherein the layer of fissile material is regular and uniform.

4. A detector according to claim 1, wherein the body is made from fritted alumina.

5. A detector according to claim 1, wherein the outer surface of the ceramic body is metallized.

6. A detector according to claim 1, wherein the electrical connecting wires are constituted by a coaxial cable defining an armature on which are mounted the electrodes.

7. A detector according to claim 6, wherein the cable is made from platinum.

8. A process for the production of a detector for neutrons and the like wherein it comprises the successive stages of constructing a subassembly incorporating two concentric tubular electrodes, a filling material which is rigid at ambient temperature being at least partly positioned between the electrodes in order to ensure the centering thereof, electrical connecting wires being connected to the electrode; moulding a ceramic material body on said subassembly in such a way that the latter is embedded in the body with the exception of one free end of the connecting wires, at least one vent traversing the body between the filling material and the exterior of the body; fluidizing the filling material by heating and discharging the fluidized material through the vent so as to define an annular chamber between the electrodes; introducing a pressurized gas into the annular chamber through the vent; and closing the vent by the melting therein of a plug of ceramic material of the same type as that constituting the body.

9. A process according to claim 8, wherein the ceramic material body is moulded in vacuo.

10. A process according to claim 8 or 9, wherein the ceramic material body is dried prior to the fluidization of the filling material.

11. A process according to claim 8, wherein the fluidization of the filling material is carried out during a first phase of a baking stage of the ceramic material body.

12. A process according to claim 11, wherein the ceramic material body is baked under a reducing atmosphere.

13. A process according to claim 11 or 12, wherein the detector is positioned vertically during the baking of the ceramic material body.

14. A process for the production of a detector for neutrons and the like wherein it comprises the successive stages of constructing a subassembly incorporating two concentric tubular electrodes, a filling material which is rigid at ambient temperature being at least partly disposed between the electrodes in order to ensure their centering, electrical connecting wires being connected to the electrodes and a ceramic rod being positioned within the inner electrode; constructing a body of a ceramic material of the same composition as that of the rod about the subassembly by heating with a torch in such a way as to embed the subassembly therein, with the exception of one free end of the connecting wires, providing at least one vent between the filling material and the outside of the ceramic body, fluidizing the filling material by heating and discharging the fluidized material through the vent in such a way as to define an annular chamber between the electrodes; introducing a pressurized gas into the annular chamber through the vent; and closing the vent by melting therein a plug of ceramic material of the same type as that constituting the body.

15. A process according to claim 8, wherein the tubular electrodes are produced by extrusion or shaping, followed by annealing, before being incorporated into the subassembly.

16. A process according to claim 8, wherein a layer of fissile material is deposited on at least one of the facing surfaces of the electrodes before the latter are incorporated into the subassembly.

17. A process according to claim 8, wherein the filling material is constituted by camphor, resin or wax.

18. A process according to claim 8, wherein the stages of introducing the pressurized gas into the annular chamber and closing the vent are performed within a tightly sealed enclosure provided with a pressurized gas intake and a window, the melting of the plug of ceramic material being performed by means of a laser through the said window.

* * * * *